2,999,741
PRODUCTION OF CARBON MONOXIDE AND HYDROGEN
Roger M. Dille and Roland W. Chapman, Whittier, and John C. Ahlborn, Monterey Park, Calif., assignors to Texaco Inc., a corporation of Delaware
Filed May 29, 1958, Ser. No. 738,839
8 Claims. (Cl. 48—196)

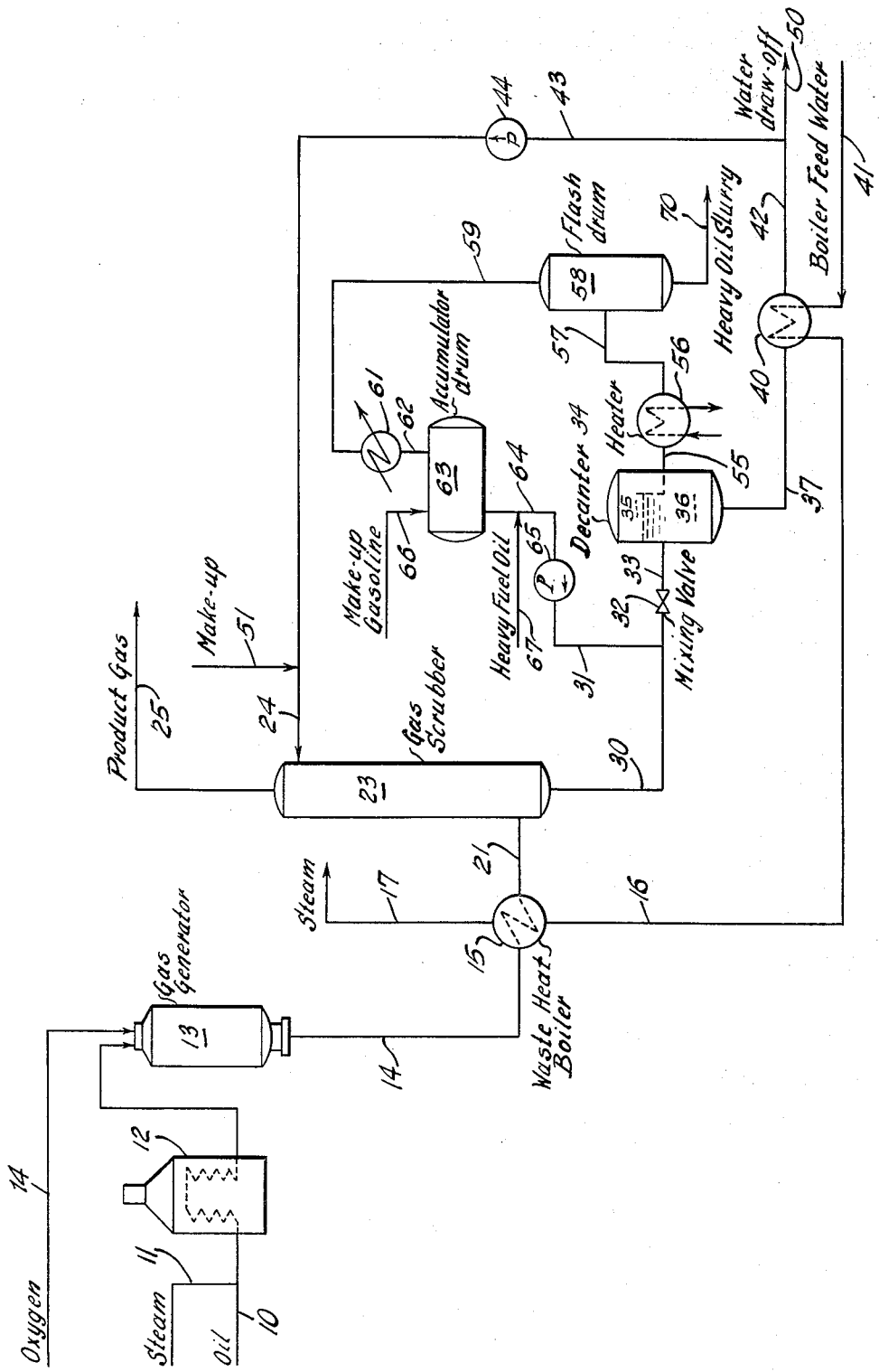

This invention relates to a process for the production of carbon monoxide and hydrogen from fossil fuels by reaction with oxygen. In one of its more specific aspects it is directed to a method of separating carbonaceous solid entrained in the gaseous products of reaction of fossil fuels and oxygen wherein said products are scrubbed with water, carbonaceous solid is separated from the scrubbing water by contacting with a heavy fuel oil-light oil mixture, clarified water and a slurry of carbon in oil are separated, and light oil is separated by vaporization forming a slurry of carbon in heavy fuel oil.

The generation of carbon monoxide and hydrogen by the partial oxidation of fossil fuels is a highly economic method of producing these gases. In the partial oxidation process, a fossil fuel, for example, coal, petroleum oil, or natural gas, is reacted with an oxygen-containing gas in a closed, compact reaction zone at an autogenous temperature within the range of about 1800 to 3500° F. preferably about 2200 to 2800° F. Preheating the reactants is generally desirable. The reaction zone is free from packing and catalyst and has nearly minimum internal surface. The reaction zone is maintained at a pressure above about 100 pounds per square inch gauge and may be as high as about 600 pounds per square inch gauge. Steam may be introduced into the reaction zone to assist in the dispersion of the fuel into the reactor, to assist in control of the reaction temperature, and as a reactant to increase the relative amount of hydrogen produced. The product consists essentially of carbon monoxide and hydrogen and contains relatively small amounts of water vapor, carbon dioxide, nitrogen, methane, hydrogen sulfide and entrained carbonaceous solid. The carbonaceous solid is in the form of very fine carbon particles, and appear to contain some chemisorbed oxygen which renders the particles easily wet by water.

The amount of uncombined oxygen supplied to the reaction zone is limited so that near maximum yields of carbon monoxide and hydrogen are obtained. Air, oxygen-enriched air or substantially pure oxygen may be employed in the process. Oxygen of high purity may be readily obtained by the rectification of air. Commercial oxygen plants, capable of delivering large amounts of high purity oxygen, typically produce oxygen streams containing in excess of 95 mol percent oxygen, and oxygen of ths purity is generally preferred.

Product gases issuing from the gas generation step contain a large amount of sensible heat. This heat may be employed to convert water to steam. For example, if the synthesis gas is to be passed to a process requiring additional steam, for example, a water gas shift process, steam may be generated by introducing water directly into the effluent gases from the gas generator. Where steam admixed with the synthesis gas stream is not desired, heat may be recovered from the gas generator effluent by passing the gases through heat exchangers or waste heat boilers. Steam for process or power use is advantageously produced in such waste heat boilers. Preheating of process streams, for example, fuel to the gas generation step, may be effected in heat exchangers. When the product gases are cooled by indirect heat exchange, it is preferred to cool the gases only to a temperature above the dew point at the prevailing pressure to avoid fouling of heat transfer surfaces occasioned by condensation of water and adhesion of entrained carbon.

The entrained carbon is effectively removed from the product gases by contacting the cooled synthesis gas with water in gas-liquid contact apparatus, for example, spray towers, bubble towers, baffle towers or packed towers. Cooling of the synthesis gas may also be effected in the scrubbing zone by vaporizing a part of the scrubbing water, by cooling the scrubbing water, or both. It is desirable to maintain the solids content of the water in the scrubbing zone less than about 2 percent solids and preferably about 1 percent solids for satisfactory pumpability. The solids content is controlled by withdrawing a portion of solids dispersion from the bottom of the scrubbing zone, removing the solids therefrom and returning clarified water to the top of the scrubbing zone. Since the amount of dispersion which must be processed for solids removal at a given carbon production rate varies inversely with the solids content of the dispersion, it is preferred to maintain the solids content of the dispersion withdrawn from the bottom of the scrubber at about 1 percent. However, efficient washing may require higher liquid rates than the amount of liquid required to suspend the separated carbon, and so a portion of the solids dispersion may be recycled to provide sufficient scrubbing liquid. The temperature of the dispersion withdrawn from the scrubbing zone is advantageously maintained at a high temperature to facilitate succeeding process steps. The scrubbing temperature can, of course, be no higher than the boiling point of water at the prevailing pressure. A substantial temperature differential may be maintained in the scrubbing zone by introducing cooled scrubbing water at the top of the scrubbing zone so that the clean scrubbed gas is discharged at a relatively low temperature and corresponding low water vapor content. It is desirable to operate the scrubber at high pressure, that is, substantially the pressure of the gas generator with allowance for pressure drop through lines and heat transfer equipment. The use of high pressures makes possible the use of relatively high temperatures in the scrubbing zone, effects advantages in succeeding carbon separating steps, and delivers the product gas for use with a minimum of compression.

The separation of the carbon from the gaseous products of partial oxidation in the form of a carbon-water dispersion produces large volumes of water containing about one percent carbon. Economics and the avoidance of water pollution require that the carbon be separated from at least a major portion of the water to permit reuse of the water and recovery of the carbon in useful form. An advantageous method of separation is to transfer the carbon to an oil by intimately contacting the water dispersion with an oil effecting separation of clarified water and a slurry of carbon in oil. The clarified water layer may be clear or may contain some residual solids. It is to be understood that the term "clarified" as used herein is to be construed in its broadest sense to refer to water of reduced solids content. The clarified water is suitable for reuse in the process and the slurry of carbon in oil is suitable for use in the generation of additional gas or as furnace or boiler fuel. Hydrocarbons have a relatively high carrying capacity for carbonaceous solid as compared with water. Pumpable slurries of carbon in liquid hydrocarbon may be produced by contacting the water dispersion with an amount of oil at least five times the weight of dispersed carbon. It is preferred to contact the water dispersion with an amount of hydrocarbon within the range of about ten to thirty times the weight of the carbon contained in the dispersion.

Contacting of the liquid hydrocarbon and water dispersion may be effected with a mixing valve, pump, orifice, nozzle, propeller mixer, or turbine mixer. It is preferred to contact the oil and water dispersion at about the temperature and pressure of the scrubbing zone. Higher pressure makes possible the use of lower boiling hydrocarbon oils. High temperature facilitates phase separation by reducing oil viscosity. Clarified water and slurry of carbon in oil are separated by passing the mixed stream to a phase separating zone, for example, a tank providing a relatively quiescent settling zone or a centrifugal separator. If a settling tank is employed, sufficient volume is provided to afford a residence time preferably of at least two minutes. Separation of the oil-carbon slurry from the clarified water may be accelerated by the addition of an emulsion breaker. Clarified water from the phase separator is returned to the scrubbing zone.

Hydrocarbons having gravities lower than 20° API have been found unsuitable for the separation of carbon in an oil slurry because the carbon-oil slurries formed with these oils do not separate from the water but form oil-water emulsions. The stability of the emulsion formed is likely due to the small difference in density of the oil and water phases and the tendency of the oil to form an emulsion. The presence of carbon, which has a density of about 1.8 grams per cubic centimeter in oil, tends to increase the density of the oil phase; as a result, oils which would otherwise readily separate from water, may form stable emulsions when present as an oil-carbon slurry.

As pointed out above the slurry of carbon in hydrocarbon separated from the clarified carbon-water is useful as fuel for the generation of additional gas or as fuel for heating purposes. However, hydrocarbons of suitable gravity for separation from mixtures with carbon and water are relatively valuable and their use in such fuel mixtures is to be avoided. In accordance with the process of this invention, carbon from the water-carbon dispersion is transferred to a heavy fuel oil-light oil mixture having a gravity over 20° API and the light oil is recovered for reuse by vaporization forming a slurry of carbon in heavy fuel oil. Heavy fuel oils suitable for use in this process include, for example, heavy distillates, residual fuel oil, bunker fuel oil or No. 6 fuel oil. Surprisingly, it is found that heavy fuel oil has a greater carrying capacity for carbon than have light hydrocarbons and transfer of the carbon to pumpable heavy fuel oil slurry may be made using an amount of heavy fuel oil less than the amount of oil required in forming slurries with higher gravity oils. However, it is preferred to use an amount of heavy oil within the range of five to twenty times the weight of carbon in the carbon-water dispersion.

Light hydrocarbon oils suitable for the preparation of heavy fuel oil mixtures having gravities of 20° API and higher, include, for example, butanes, pentanes, hexanes, benzol, toluol, natural gasoline, gasoline, naphtha, gas oil, their mixtures and the like. The slurry of carbon in the heavy oil-light oil mixture is separated from the clarified scrubbing water by decantation. The light oil is then separated from the heavy oil-light oil slurry by a vaporization process, for example, fractional distillation or flashing. Advantageously, the water scrubbing and oil contacting steps are effected at elevated pressures and temperatures so that the light oil is vaporized by the sensible heat of the slurry upon the release of pressure. Alternatively, the light oil may be separated from the slurry by fractional distillation in accordance with methods well known in the art utilizing feed preheat and reboiler heat from external sources. The vaporized light hydrocarbon is separated from the heavy fuel oil-carbon slurry and cooled to recondense the light hydrocarbon liquid. The light hydrocarbon liquid is then recycled for use in contacting additional carbon-water dispersion. The heavy fuel oil-carbon is withdrawn for fuel use.

When ash-containing fossil fuels, for example, coal, are used for the production of carbon monoxide and hydrogen, it is generally desirable to separate at least a part of the ash from the reaction products. Removal of the ash increases the utility and value of the carbon which is separately recovered and facilitates the clarification of the carbon-containing scrubbing water. A large part of the ash is easily removed in a quench zone wherein the products are cooled by direct contact with water and the molten ash converted to a sand-like solid slag which settles to the bottom of the quench zone and may be withdrawn through lock hoppers. The quenched gas containing entrained carbon and fine slag is then contacted with water in a scrubbing zone to effect removal of substantially all of the solids from the gas forming a dispersion of solid in the scrubbing water. The scrubbing water dispersion is then passed to one or more settlers where the relatively coarse and dense slag particles are settled and the water containing dispersed carbon particles is withdrawn. The carbon-water dispersion is then contacted with oil as described above to effect clarification of the water and formation of an oil-carbon slurry.

An advantage of the process of this invention is that carbon is effectively and efficiently removed from synthesis gas.

Another advantage of the process of this invention is that the carbon formed in the manufacture of synthesis gas is separated as a slurry in heavy fuel oil useful in the generation of additional synthesis gas or as fuel for heating purposes.

Another advantage of this process is that heat contained in gas generation products is efficiently utilized.

Having set forth its general nature the invention will be best understood from the more detailed description hereinafter which refers to the accompanying drawing. Although the drawing illustrates one arrangement of apparatus in which the process of this invention may be practiced it is not intended to limit the invention to the particular apparatus or material described.

Bunker fuel oil in line 10 is admixed with steam from line 11 and the mixture passed through heater 12 to gas generator 13. Oxygen in line 14 is admixed with the steam-oil mixture in gas generator 13. The steam, oil, and oxygen react in gas generator 13 at an autogenous temperature of about 2800° F. and 300 pounds per square inch gauge to produce a synthesis gas comprising carbon monoxide and hydrogen. Additionally, the synthesis gas contains entrained carbon amounting to about 2 percent of the carbon content of the oil feed. Hot synthesis gas from generator 13 is withdrawn through line 14 and passed to waste heat boiler 15 where the synthesis gas is cooled and steam is generated. Heated boiler feed water in line 16 is passed to waste heat boiler 15, and the steam generated is withdrawn through line 17 for use not shown. The cooled synthesis gas is passed through line 21 to gas scrubber 23, where the synthesis gas and entrained carbon are contacted in countercurrent flow with scrubbing water introduced through line 24. Product gas, substantially free of entrained carbon, is withdrawn through line 25 and discharged for utilization not shown.

Scrubbing water comprising about 1 percent dispersed carbon is withdrawn from scrubber 23 through line 30 at a temperature of about 275° F. The scrubbing water-carbon dispersion is contacted with a mixture of light straight run gasoline and heavy fuel oil from line 31 and the combined stream passed through mixing valve 32. A pressure drop of about 30 pounds per square inch across mixing valve 32 effects high turbulence and mixing of the water, carbon and oil mixture. The combined stream then passes through line 33 into decanter 34. Two phases form in decanter 34 comprising an oil-carbon phase 35 floating on a clarified water phase 36. Clarified water is withdrawn through line 37 cooled by heat exchange with boiler feed water from line 41 in the boiler feed water heater 40 and recycled to gas scrubber 23, through lines 42, 43 and 24 by pump 44. Blowdown water is withdrawn through line 50 as necessary to discharge accumulated condensate and to prevent the accumulation of water soluble impurities. Make-up water to compensate for losses or water withdrawn as blowdown is added as necessary through line 51.

Oil-carbon slurry from separator 34 is withdrawn through line 55, and passed through heater 56 where the stream is heated to a temperature above the boiling point of the light gasoline component of the oil mixture. The heated stream is then pased through line 57 to light oil flash drum 58 where the gasoline is vaporized, and the carbon transferred to the heavy fuel oil to form a slurry of carbon in heavy fuel oil. Gasoline vapor is withdrawn through line 59, cooled and condensed in condenser 61 and the condensed gasoline passed through line 62 to accumulator drum 63. Gasoline in accumulator drum 63 is withdrawn through line 64 admixed with heavy fuel oil from line 67 and passed by pump 65 and line 31 into contact with additional water-carbon dispersion. Make-up gasoline to compensate for any gasoline lost from the system is added through line 66. A slurry of carbon in heavy fuel oil is withdrawn through line 70 for fuel use not shown.

*Example*

Synthesis gas is produced by the partial oxidation of a bunker fuel oil at a temperature of 2600° F. and at 300 pounds per square inch gauge. In the generation of the synthesis gas, 2 percent of the carbon content of the fuel oil is unconverted to gaseous products and appears as entrained carbon in the product gas. The hot synthesis gas is cooled to 400° F. and steam is generated by passing the synthesis gas through a waste heat boiler. The cooled gas is scrubbed with water in a scrubber maintained at 350 pounds per square inch gauge. Scrubbing water containing 0.24 weight percent entrained carbon is withdrawn at a rate of 5880 pounds per hour and at a temperature of 265° F. The scrubbing water is contacted with a 20.2° API mixture of two parts of a 27.0° API gas oil and one part of a 9.6° API bunker fuel oil at a combined temperature of 265° F. and at a rate of 55.5 gallons per hour. The mixture of scrubbing water, carbon, and oil is thoroughly mixed by passing through a valve which discharges to a separating zone maintained at 250 pounds per square inch gauge.

A slurry of carbon in oil floats on top of clarified water in the separator with a residence time in the separator of 3.2 minutes. Clarified water is withdrawn at a temperature of 250° F. and returned to the gas scrubber.

Oil carbon slurry is withdrawn and passed to a steam still where the gas oil component is separated by distillation. The recovered gas oil is recycled for mixture with additional fuel oil and contact with carbon-containing scrubber water. The steam still bottoms consisting of bunker fuel oil containing 9.2 weight percent carbon and having a gravity of 3.8° API and a heating value of 17,822 B.t.u. per pound is pumpable and is suitable for fuel use.

Obviously, many modifications and variations of the invention, as hereinbefore set forth, may be made without departing from the spirit and scope thereof, and therefore only such limitations should be imposed as are indicated in the appended claims.

We claim:

1. A method for recovering carbonaceous solid from a gas stream resulting from reaction of carbonaceous fuel with oxygen in a reaction zone to produce a product gas stream comprising carbon monoxide, hydrogen, and entrained carbonaceous solid, which comprises contacting said product gas stream with water in a gas scrubbing zone effecting removal of carbonaceous solid from said gas stream and forming a dispersion of solid in water, contacting said dispersion with a liquid hydrocarbon mixture having a gravity above 20° API and containing lower gravity components effecting resolution of said dispersion into clarified water and a slurry of solid in said hydrocarbon mixture, separating said slurry and said clarified water, and vaporizing a portion of said hydrocarbon mixture comprising said slurry and forming a residue slurry of carbonaceous solid in oil having a gravity below 20° API.

2. The process of claim 1 wherein the vaporized portion of said hydrocarbon mixture is separately withdrawn as hydrocarbon vapor, said hydrocarbon vapor is condensed, and said condensed hydrocarbon is admixed with hydrocarbon having a gravity below 20° API to form said mixture having a gravity above 20° API.

3. A method for recovering carbonaceous solid from a gas stream resulting from reaction of carbonaceous fuel with oxygen in a reaction zone to produce a product gas stream comprising carbon monoxide, hydrogen, and entrained carbonaceous solid, which comprises contacting said product gas stream with water in a gas scrubbing zone effecting removal of carbonaceous solid from said gas stream and forming a dispersion of solid in water, contacting said dispersion with a liquid hydrocarbon mixture having a gravity above 20° API and comprising a vaporizable hydrocarbon and a heavy fuel oil effecting resolution of said dispersion into clarified water and a slurry of solid in said hydrocarbon mixture, separating said slurry and said clarified water, vaporizing said vaporizable hydrocarbon component of said hydrocarbon mixture comprising said slurry and forming a residue slurry of carbonaceous solid in heavy fuel oil having a gravity below 20° API.

4. A method for recovering carbonaceous solid from a gas stream resulting from reaction of carbonaceous fuel with oxygen in a reaction zone to produce a product gas stream comprising carbon monoxide, hydrogen, and entrained carbonaceous solid, which comprises contacting said product gas stream with water in a gas scrubbing zone effecting removal of carbonaceous solid from said gas stream and forming a dispersion of solid in water, contacting said dispersion with a liquid hydrocarbon mixture having a gravity above 20° API and comprising a vaporizable hydrocarbon and a heavy fuel oil at a rate such that the heavy fuel oil component of said mixture is 5 to 20 times the weight of the carbonaceous solid in the dispersion with which said mixture is contacted effecting resolution of said dispersion into clarified water and a slurry of solid in said hydrocarbon mixture, separating said slurry and said clarified water, and vaporizing said vaporizable hydrocarbon component of said hydrocarbon mixture comprising said slurry and forming a residue slurry of carbonaceous solid in heavy fuel oil.

5. A method for recovering carbonaceous solid from a gas stream resulting from reaction of a carbonaceous fuel with oxygen in a reaction zone to produce a product gas stream comprising carbon monoxide, hydrogen, and entrained carbonaceous solid, which comprises contacting said product gas stream with water in a gas scrubbing zone effecting removal of carbonaceous solid from said gas stream and forming a dispersion of solid in water, contacting said dispersion with a liquid hydrocarbon mixture having a gravity above 20° API comprising gas oil and bunker fuel oil effecting resolution of said dispersion into clarified water and a slurry of solid in said hydrocarbon mixture, separating said slurry and said clarified water, and distilling said gas oil from said slurry forming a residue slurry of carbon in said heavy fuel oil.

6. A method for recovering carbonaceous solid from a gas stream resulting from reaction of carbonaceous fuel with oxygen in an unpacked reaction zone at an autogenous temperature within the range of about 1800 to 3500° F. and at a pressure within the range of about 100 to about 600 pounds per square inch gauge producing a hot gas stream comprising hydrogen, carbon monoxide, water vapor, and entrained carbonaceous solid, which comprises partially cooling said hot gas stream by indirect heat exchange to a temperature above its dew point, contacting the partially cooled gas stream with water in a scrubbing zone effecting separation of carbonaceous solid therefrom, and forming a dispersion comprising not more than about 1.0 weight percent carbonaceous solid, contacting said dispersion with a liquid hydrocarbon mixture having a gravity above 20° A.P.I and comprising a vaporizable hydrocarbon and a heavy fuel oil effecting resolution of said dispersion into a layer of clarified water and a floating layer of a slurry of said solid in said hydrocarbon mixture, decanting said slurry from said clarified water, and vaporizing said vaporizable hydrocarbon component of said hydrocarbon mixture comprising said slurry and forming a residue slurry of carbon in oil having a gravity below 20° API.

7. The process of claim 5 wherein the heavy fuel oil component of said liquid hydrocarbon mixture is 5 to 20 times the weight of the carbonaceous solid in the dispersion with which said mixture is contacted.

8. A method for recovering carbonaceous solid from a dispersion of carbonaceous solid in water which comprises contacting said dispersion with a liquid hydrocarbon mixture having a gravity above 20° API and containing lower gravity components effecting resolution of said dispersion into clarified water and a slurry of carbonaceous solid in said hydrocarbon mixture, separating said slurry and said clarified water, and vaporizing a volatile portion of said hydrocarbon mixture from said slurry forming a residue slurry of carbonaceous solid in oil having a gravity below 20° API.

References Cited in the file of this patent

UNITED STATES PATENTS

| | | |
|---|---|---|
| Re. 22,454 | Weigand | Mar. 7, 1944 |
| 736,381 | Gloyner | Aug. 18, 1903 |
| 1,946,947 | Pratt | Feb. 13, 1934 |
| 2,665,980 | Carkeek | Jan. 12, 1954 |
| 2,677,439 | Hedberg | May 4, 1954 |
| 2,746,564 | Williams | May 22, 1956 |
| 2,793,938 | Frank | May 28, 1957 |

UNITED STATES PATENT OFFICE

CERTIFICATE OF CORRECTION

Patent No. 2,999,741 September 12, 1961

Roger M. Dille et al.

It is hereby certified that error appears in the above numbered patent requiring correction and that the said Letters Patent should read as corrected below.

In the grant, line 1, and in the heading to the printed specification, line 4, name of second inventor, for "Roland W. Chapman", each occurrence, read -- Ronald W. Chapman --.

Signed and sealed this 6th day of March 1962.

(SEAL).
Attest:

ERNEST W. SWIDER
Attesting Officer

DAVID L. LADD
Commissioner of Patents